United States Patent [19]

Kohlenberger et al.

[11] 4,275,599

[45] Jun. 30, 1981

[54] SENSOR FOR MEASURING DYNAMIC VARIATIONS IN STRAIN

[75] Inventors: Charles W. Kohlenberger, Fullerton; Craig G. Kirkpatrick, Santa Ana; John A. Estrada, South San Gabriel; George Q. Chang, La Habra, all of Calif.

[73] Assignee: Rockwell International Corporation, El Segundo, Calif.

[21] Appl. No.: 105,690

[22] Filed: Dec. 20, 1979

[51] Int. Cl.³ ............................................. G01B 11/16
[52] U.S. Cl. ................................. 73/774; 33/125 A; 356/32
[58] Field of Search ................ 73/143, 705, 774, 763, 73/651, 653, 655, 800, DIG. 11; 33/1 L, 125 A, DIG. 3; 356/32, 373

[56] References Cited

U.S. PATENT DOCUMENTS

| 3,229,511 | 1/1966 | Rossire ................................. 356/32 |
| 3,662,596 | 5/1972 | Siefert . |
| 3,850,035 | 11/1974 | Seabury, Jr. . |
| 3,864,953 | 2/1975 | Fletcher et al. ....................... 73/143 |
| 3,871,217 | 3/1975 | Miley . |
| 3,913,563 | 10/1975 | Ball . |
| 4,158,962 | 6/1979 | Conoval . |

FOREIGN PATENT DOCUMENTS 174967  5/1953  Austria .

Primary Examiner—Charles A. Ruehl
Attorney, Agent, or Firm—H. Fredrick Hamann; Gilbert H. Friedman

[57] ABSTRACT

A sensor for measuring dynamic variations in axial strain in a cable wherein a light source is positioned intermediate a pair of light detectors. The sensor is capable of sensing the effects of dynamic axial tensile and compressive forces in the cable over a wide range of frequencies.

5 Claims, 2 Drawing Figures

SENSOR FOR MEASURING DYNAMIC VARIATIONS IN STRAIN

BACKGROUND OF THE INVENTION

This invention relates to transducers for sensing dynamic variations in strain in deformable structures such as cables or rods and for producing an indication proportional to the strain.

In many environments, particularly in connection with logging, construction and oil drilling activities, it is important to monitor the in-line or longitudinal strain due to the dynamic tensile and compressive forces acting on cables and rods in order to predict the safety of continued use of the cable or rod and its anchor. At one time, it was the custom to insert into a cable at some convenient point a device to be deformed by stress on the cable for directly measuring the strain. That is, the measuring or indicating device was included in series in the cable line. This meant that it was necessary to interrupt the cable in some fashion. The devices used had to be capable of withstanding the maximum expected load. They thus tended to be bulky, expensive and inaccurate. More recently, there has been a trend toward developing techniques for measuring loads on a cable which do not require interruption of the cable.

Austrian Pat. No. 174,967, issued May 26, 1953, discloses a device for measuring strain in a cable wherein the device is clamped to two spaced-apart points on the cable. All of the load is bypassed from the cable to load bearing lines in the device. A gauge for displaying the measured strain or tension is included in one of the load bearing lines. The use of such a device tends to degrade the safety margin below that which is inherent in the unmodified cable. That is because such a strain measuring device disturbs the normally uniform stress distribution in a cable. Disturbing the stress distribution in this manner tends to cause concentrations of stress at certain points. Where the stress concentration is excessively high, failure of the cable, sensor or both may occur. Additionally, if the load bearing lines were to rupture or break, a hazardous transient force would be applied to the cable. As another disadvantage of this device, problems may occur as a result of its use to measure strain in ordinary twisted cables. Such cables tend to rotate when they are stretched. Due to the fact that this device totally relaxes the cable in the region where the measuring device is attached, all of the rotation due to stretching of the cable will appear across the strain measuring device. This rotation tends to twist the device out of shape and also tends to impair its accuracy.

Seabury, Jr., U.S. Pat. No. 3,850,035 issued Nov. 26, 1974, typifies known devices for directly measuring cable line tension which use electrical or mechanical transducers. The cable bears against a cleat having limited and restrained rotatability. Rotation of the cleat is mechanically linked to a variable electrical resistor. Such devices are limited to sensing tensile loads only because their output signals are scalars. That is, the output signals do not change polarity when the load on the cable changes from longitudinal or axial tension to longitudinal or axial compression. Thus, the occurrence of compression loading cannot be distinguished from tension loading. In addition, the practical dynamic response of such devices is limited to low frequency strain variations. That is because the internal linkages of the devices have a resonance. The effects of dynamic strain variations at frequencies higher than the resonance frequency will be attenuated. Use of the device of Seabury, Jr., suffers from two additional disadvantages. First, the placement of the cleat is restricted to be at the end of the load-bearing portion of the cable. Thus, the strain-measuring device cannot be placed at any convenient point along the length of the cable. Second, the cleat must be placed in-line between the cable and an anchor for the cable. This requirement causes the same undesirable consequences to the system as devices which interrupt the cable as discussed above. As has been stated, such devices tend to be bulky, expensive and inaccurate. In addition, they tend to insert an additional impedance mismatch in the load-bearing line between a cable and its anchor. This alters the frequency characteristics of the system in a way which tends to complicate the task of measuring dynamic variations in the loading.

Miley, U.S. Pat. No. 3,871,217 issued Mar. 18, 1975, and Conoval, U.S. Pat. No. 4,158,962 issued June 26, 1979, are exemplary of devices which indirectly monitor the load on a rod or cable by inductively or optically monitoring the variation in the natural frequency of one of the many lateral or radial oscillatory modes of the deformable structure. Such devices are suitable for measuring static loads. However, it is difficult and expensive to attempt to use such devices to detect and measure dynamic axial or longitudinal loads on the cable or rod. That is because the transformation of the dynamic variation in axial strain to a variation in oscillatory motion is a complicated nonlinear process. Therefore, some of the dynamic axial strain information is likely to be lost. Furthermore, such axial strain information as does appear in the lateral oscillatory motion appears as modulation of a mode. Complex and expensive signal detection and demodulation schemes are thus required to extract the dynamic axial loading information from the lateral displacement oscillatory signal.

Siefert, U.S. Pat. No. 3,662,596 issued May 16, 1972, discloses a strain gauge device which measures strain in metal cords embedded within a tire; individual strain gauges are interconnected in a bridge. Such a device has the advantage of being capable of measuring both compressive and tensile dynamic loads. This device is difficult to attach to the cord being observed inasmuch as soldering or the equivalent is required. In addition, the attachment of such a device to cords or cables modifies the frequency characteristic of the deformable structure in a complex way since an impedance discontinuity is thereby introduced into the structure. As a result, stress concentrations occur at the discontinuities. The stress concentrations act as energy reflection points. This greatly complicates the task of predicting the consequences of the dynamic load variations acting on the cable and its anchor. In addition, the occurrence of stress concentrations increases the risk of mechanical failure of the cable itself.

SUMMARY OF THE INVENTION

It is an object of this invention to provide a cable strain transducer for converting strain or differential movement in a cable, rod or similar deformable structure to an electrical signal.

Another object of the invention is to provide a cable strain transducer for converting differential displacement of two spaced-apart points on a cable, rod or similar deformable structure to an electrical signal.

Still another object of the invention is to provide a cable strain transducer which is capable of sensing displacement in a cable or the like due to both forces tending to cause axial elongation and forces tending to cause axial compression of the cable.

A further object of the invention is to provide a cable strain sensor which is capable of sensing dynamic variations in cable strain over a wide range of frequencies.

A still further object of the invention is to provide a cable strain transducer which is capable of being reliably operated under adverse field environmental conditions such as those encountered in logging, construction and oil-well drilling.

Another object of the invention is to provide a cable strain sensor which is capable of providing indications of differential displacement in a cable, rod or the like without being inserted in series with the cable line.

Yet another object of the invention is to provide a cable strain transducer capable of being mounted on a cable, rod or similar structural member without significantly altering the normal distribution of stress in the member.

Still another object of the invention is to provide a cable strain transducer capable of being mounted at any convenient location on the cable.

A further object of the invention is to provide a cable strain sensor capable of being mounted on a structural member such as a cable, rod or the like while the structural member is already under load without having to modify the attachment of the cable to its anchors.

A stil further object of the invention is to provide a cable strain sensor having a vector output signal capable of unambiguously indicating the effects of both axial tension and axial compression in the cable.

Another object of the invention is to provide a cable strain transducer capable of indicating strain in a cable, rod or a similar deformable structure without applying force or delivering energy to the structure.

These objects and the general purpose of this invention are accomplished in a device for measuring strain in a wire cable or other deformable member wherein a light source is positioned intermediate a pair of light detectors. The light source is mounted on a bracket which is clamped to the cable at a first point. The light detectors are mounted on another bracket which is clamped to the cable at a second point spaced apart along the cable from the first point. When the light source is equidistant from the two light detectors, the differential output signal produced by the detectors is substantially zero. Strain in the cable, either tensile or compressive, moves the light source closer to one of the light detectors and further away from the other light detector. The differential signal thus produced by the light detectors is substantially proportional to the strain.

It is apparent then that a cable strain transducer in accord with the invention overcomes the disadvantages of earlier cable strain transducers while offering significant new advantages. For example, a cable strain transducer according the invention is light weight, compact and inexpensive to fabricate. Since it does not cause stress concentration in the structural member being monitored nor does it have stress concentrations of its own, a cable strain transducer according to the invention is relatively safe to use. In addition, a cable strain transducer according to the invention consumes a relatively small amount of electrical energy, all of which can be supplied as direct current.

DESCRIPTION OF THE PREFERRED EMBODIMENT

Figure 1:
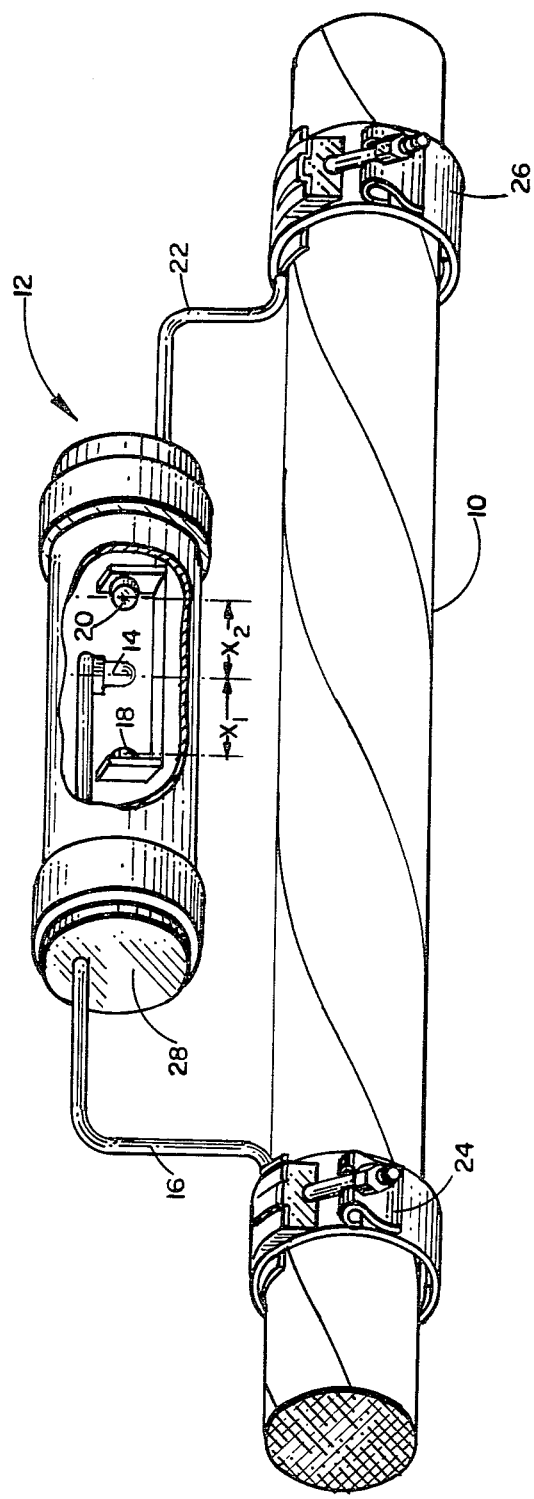
FIG. 1 is a perspective view of a preferred embodiment of the invention.

Referring now to FIG. 1, there is shown a twisted wire cable 10 on which there is mounted a strain sensor 12 in accord with the invention. A light source 14 is mounted on a first bracket 16. A pair of photodetectors 18 and 20 are mounted on a second bracket 22. The photodetectors 18 and 20 are spaced apart from each other along a line more or less parallel to the line of the cable 10. The light source 14 is preferably disposed to be more or less equidistant from photodetectors 18 and 20 when there is no force acting on the cable 10.

The brackets 16 and 22 are each fastened or clamped to the cable 10 by cable attachments 24 and 26, respectively, preferably at a distance of about two to three feet from each other. Cable attachments 24 and 26 are preferably of the quick-release type for easy mounting and dismounting of the strain sensor 12.

The ends of the brackets 16 and 22 on which the light source 14 and photodetectors 18 and 20 are mounted are enclosed within a sealing container 28. Sealing container 28 isolates photodetectors 18 and 20 from external sources of light.

Light source 14 preferably uses light-emitting diodes. The photodetectors 18 and 20 are preferably of the variable resistance type such as those in which the light sensitive material is cadmium sulfide, lead sulfide or cadmium selenide. Of course, photogenerators such as, for example, silicon diodes may be used in place of variable resistance photodetectors. If photogenerators are used, however, their output signal may require amplification in order to be readily usable. In order to take advantage of the greater light intensity obtainable due to the focusing effect of emitter designs, light source 14 preferably comprises two light-emitting diodes, each disposed to have its focused beam directed toward one of photodetectors 18 and 20, respectively.

Forces acting on the elastic cable 10 cause strain and therefore displacement of the light source 14 relative to the pair of photodetectors 18 and 20. Photodetectors 18 and 20 are shown in FIG. 1 as being separated by a distance $X_1 + X_2$ where $X_1$ is the distance from photodetector 18 to light source 14 which $X_2$ is the distance from photodetector 20 to light source 14. When $X_1$ is equal to $X_2$, the light supplied to each photodetector and their resultant output signals will be substantially equal. As light source 14 is displaced, the distances $X_1$ and $X_2$ will change. A difference between these two distances produces a difference in the outputs of photodetectors 18 and 20. This difference tends to be proportional to the difference in the distances $X_1$ and $X_2$.

For some deformable structures such as the twisted cable 10, strain is accompanied by rotation of the structural member. Such rotation can degrade the accuracy and utility of a cable strain transducer as was discussed above. Therefore, when a cable strain transducer 12 in accord with the invention is to be used with a twisted cable, special features to minimize the deleterious effects of rotation are preferably included therein. In this case, the carrier portion of bracket 16 on which light source 14 is mounted is made rotatable or is pivoted with respect to the portion of bracket 16 which is intended to be clamped to the cable 10 by cable attachment 24. This is accomplished by inserting a ball-and-socket swivel joint (not shown) between the carrier and clamped portions of bracket 16. Similarly, the carrier portion of bracket 22 on which photodetectors 18 and 20 are mounted is made rotatable or is pivoted with respect to the portion of bracket 22 which is intended to be clamped to the cable 10 by cable attachment 26. This is accomplished by inserting a ball-and-socket swivel joint (not shown) between the carrier and clamped portions of bracket 22. Tubular fittings (not shown) inside sealing container 28 are mounted to keep the carrier portions of brackets 16 and 22 aligned to each other despite rotation of cable 10. Any remaining apparent lengthening or shortening of cable 10 due to rotation can then readily be calibrated out of the readings obtained from the sensor 12.

Figure 2:
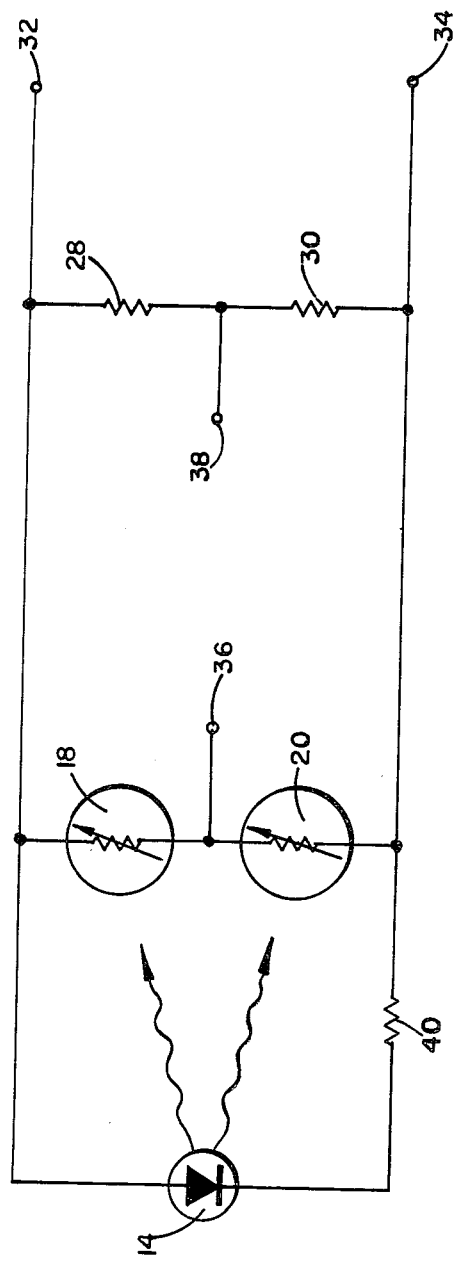
FIG. 2 is a circuit diagram showing the electrical interconnection of elements of the invention.

FIG. 2 illustrates a circuit suitable for detecting the differential signal resulting from unequal illumination of photodetectors 18 and 20. The photodetectors are interconnected into a Wheatstone bridge circuit with reference resistors 28 and 30. Power for the circuit is applied at terminals 32 and 34. The differential output signal appears across terminals 36 and 38. The same power source may be used to energize light source 14 through ballast resistor 40.

While the invention has been described in the preferred embodiment, it will be understood that the words which have been used are words of description rather than of limitation and that changes within the purview of the appended claims may be made without departing from the true scope and spirit of the invention in its broader aspects.

What is claimed is:

1. A strain sensor, comprising:
   a first bracket having a pair of photodetectors mounted thereon, wherein said photodetectors are spaced apart from each other;
   a second bracket having a light source mounted thereon;
   means for fastening said first and second brackets to a deformable structure in a manner which disposes said light source intermediate said pair of photodetectors so that strain occurring in said elastic structure causes the distances between one of said photodetectors and said light source to decrease while the distance between the other of said photodetectors and said light source increases; and
   a sealing container enclosing said light source and said pair of photodetectors.

2. The strain sensor recited in claim 1 wherein said light source comprises a light-emitting diode.

3. The strain sensor recited in claim 1 further comprising electrical means for responding to said photodetectors and producing a signal proportional to the differential output of said photodetectors.

4. The strain sensor recited in claim 3 wherein said photodetectors are cadmium sulfide, lead sulfide or cadmium selenide cells.

5. The strain sensor recited in claim 1 wherein said fastening means is adapted for quick release from said deformable structure.

* * * * *